United States Patent
Han et al.

(10) Patent No.: US 10,785,243 B1
(45) Date of Patent: Sep. 22, 2020

(54) IDENTIFYING EVIDENCE OF ATTACKS BY ANALYZING LOG TEXT

(71) Applicant: Symantec Corporation, Mountain View, CA (US)

(72) Inventors: Yufei Han, Antibes (FR); Michael Hart, Farmington, CT (US); Joseph Lopilato, Townsend, MA (US)

(73) Assignee: NORTONLIFELOCK INC., Mountain View, CA (US)

( * ) Notice: Subject to any disclaimer, the term of this patent is extended or adjusted under 35 U.S.C. 154(b) by 182 days.

(21) Appl. No.: 16/147,467

(22) Filed: Sep. 28, 2018

(51) Int. Cl.
*H04L 29/06* (2006.01)
*G06N 3/08* (2006.01)

(52) U.S. Cl.
CPC ........... *H04L 63/1425* (2013.01); *G06N 3/08* (2013.01); *H04L 63/145* (2013.01)

(58) Field of Classification Search
CPC .................. H04L 63/1425; H04L 63/145
See application file for complete search history.

(56) References Cited

U.S. PATENT DOCUMENTS

| 10,530,809 | B1* | 1/2020 | Hart ...................... H04L 63/145 |
| 2005/0093556 | A1* | 5/2005 | Mueller ............... G01N 33/493 |
| | | | 324/693 |
| 2009/0089592 | A1* | 4/2009 | Kudo .................... H04L 9/3236 |
| | | | 713/193 |
| 2009/0122979 | A1* | 5/2009 | Lee ......................... G06F 21/32 |
| | | | 380/28 |
| 2011/0099136 | A1* | 4/2011 | Barajas .................... G06F 17/18 |
| | | | 706/13 |
| 2013/0035979 | A1* | 2/2013 | Tenbrock ............... G06Q 30/02 |
| | | | 705/7.29 |
| 2013/0333043 | A1* | 12/2013 | Lee ........................ G06F 21/577 |
| | | | 726/25 |
| 2015/0156213 | A1* | 6/2015 | Baker ................. H04L 63/1416 |
| | | | 726/23 |
| 2016/0259737 | A1* | 9/2016 | Saldanha ............ G06F 21/6209 |
| 2017/0103228 | A1* | 4/2017 | Yavuz ..................... H04L 9/083 |
| 2017/0109600 | A1* | 4/2017 | Voloshynovskiy .......................... |
| | | | G06K 9/00577 |
| 2017/0193009 | A1* | 7/2017 | Rapantzikos ......... G06F 16/335 |
| 2018/0018460 | A1* | 1/2018 | Brown .................. G06F 21/554 |
| 2018/0293313 | A1* | 10/2018 | Hauptmann ............ G06F 16/78 |
| 2018/0336880 | A1* | 11/2018 | Arik ...................... G10L 15/063 |
| 2018/0349207 | A1* | 12/2018 | Erickson ................... G06F 9/52 |
| 2019/0124202 | A1* | 4/2019 | Dubey ................... G06Q 50/01 |

(Continued)

OTHER PUBLICATIONS

Tuor et al., "Deep Learning for Unsupervised Insider Threat Detection in Structured Cyber Data Streams", https://arxiv.org/pdf/1710.00811.pdf, Dec. 15, 2017, 9 pages.

(Continued)

*Primary Examiner* — Ali Shayanfar
(74) *Attorney, Agent, or Firm* — Patent Law Works LLP

(57) ABSTRACT

Log text is encoded into a low dimensional feature vector. A temporal predictive model is constructed based on the low dimensional feature vector. The temporal predictive model is used to calculate probabilities of the occurrence of security incidents based on signature names from the log text encoded in the low dimensional feature vector. A preventative security action is automatically taken in response to the calculated probability of the occurrence of a specific security incident exceeding a given threshold.

19 Claims, 4 Drawing Sheets

(56) References Cited

U.S. PATENT DOCUMENTS

2019/0190926 A1* 6/2019 Choi .................. G06N 3/08
2019/0219994 A1* 7/2019 Yan .................. G05B 13/027
2019/0327258 A1* 10/2019 Choi .................. H04L 41/22

OTHER PUBLICATIONS

Bontemps et al., "Collective Anomaly Detection based on Long Short-Term Memory Recurrent Neural Network". https://arxiv.org/ftp/arxiv/papers/1703/1703.09752.pdf, Mar. 28, 2017, 12 pages.
Staudemeyer, "Applying long short-term memory recurrent neural networks to intrusion detection", Research Article—SACJ No. 56, Jul. 2015, 19 pages.

* cited by examiner

IDENTIFYING EVIDENCE OF ATTACKS BY ANALYZING LOG TEXT

TECHNICAL FIELD

This disclosure pertains generally to computer security analysis, and more specifically to identifying evidence of attacks and other security incidents on computer systems by analyzing the text of logs.

BACKGROUND

Computer security components such as anti-malware scanners, firewalls and intrusions detection systems produce logs as they monitor network traffic, files, computer activity, etc. A substantial percentage of the lines of log text (signatures) are weakly predictive of actionable security incidents such as actual attacks. For example, here is an ominous looking signature from the log of an actual threat prevention system: "Internet Explorer Malformed IFRAME Buffer Overflow (MS04-040)—Ver2 (CVE-2004-1050)." Although a person without training would likely interpret this log line as indicative that a buffer has actually overflowed, which would be potentially indicative of an attack in progress, it is in fact the case that the presence of this signature is weakly predictive of an actionable security incident, despite both the MS Security Bulletin and CVE number. Many signatures fall into this category.

Very large volumes of logs are produced, requiring parsing and analysis. The volume of log text to process is especially large at providers of centralized security services, which receive logs from a large number of enterprises and/or endpoints. Conventionally, human security analysts go through these logs, and correlate individual log lines and patterns of multiples signatures to actual threats (or the lack thereof). Human security analysts use a combinations of empirical knowledge and human reasoning to make such correlations.

Because the quantity of log text is so great and the variety of signatures from different security products so varied (including multiple different signatures that signify the same or similar underlying event(s)), it is a huge burden of effort for human analysts to process this information in real time, identify actual threats, including those that are in process, and take preventative action, while further understanding the utility or lack thereof of individual log lines and patterns of signatures that occur in particular temporal orders.

It would be desirable to address these issues.

SUMMARY

Evidence of security incidents are identified by analyzing log text. Log text is encoded into a low dimensional feature vector. This can take the form of encoding signature names in the log text, as well as frequency information and temporal occurrence information concerning the signature names, into the low dimensional feature vector. This can be done, for example, by utilizing an unsupervised learning algorithm to obtain vector representations of words, and/or by producing word embeddings in one or more shallow neural network(s). One or more recurrent neural network(s) can be used to capture sequential and temporal aspects of the log text in the low dimensional feature vector. Same or similar events that are represented by different signatures in the log text have same or similar identifiers in the low dimensional feature vector. Events represented by signatures in the log text can be clustered by event type in the low dimensional feature vector. In one embodiment, latent topics of signature names and/or relationships between signature names are automatically learned, based on the low dimensional feature vector.

A temporal predictive model is constructed based on the low dimensional feature vector, using, for example, a hidden Markov model. In other embodiments, the temporal predictive model is constructed using other techniques, such as Kalman filtering, a dynamic Bayesian network and/or a long short-term memory based predictor.

The temporal predictive model is used to calculate probabilities of the occurrence of security incidents based on at least signature names from the log text encoded in the low dimensional feature vector. In this context, a generative model can be applied to describe an occurrence probability of a security incident based on one or more sequential patterns of signature names. In one embodiment, probabilistic associations between given signature names in the log text and likelihoods of the occurrence of given security incidents are learned automatically, based on the observed sequential patterns of signature names and security incidents. Further, likelihoods of the occurrence of given security incidents can be automatically forecast, based on one or more analyzed sequence(s) of log text.

In one embodiment, key signatures that are strongly predicative of the occurrence of a given security incident are automatically identified, and the conditional occurrence probability of a given security incident can be estimated, in response to detecting key signature names in a sequence of log text. In addition, given signature names can be associated with types and/or categories of security incidents of which the given signature names have been determined to be strongly predictive. In one embodiment, probability distributions ranking likelihoods of the occurrence of specific future events are constructed, based on sequences of analyzed log text. Such constructed probability distributions can be provided as input to a Security Incident and Event Manager (SEIM) or a Managed Security Service Provider (MSSP), for example to prioritize investigations or bring attention to certain hosts and users.

A preventative security action is automatically taken in response to the calculated probability of the occurrence of a specific security incident exceeding a given threshold. Such a security action can include, for example, blocking one or more events on a computing device, removing one or more files from a computing device, cleaning malicious code from one or more files, automatically generating an alert, etc.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
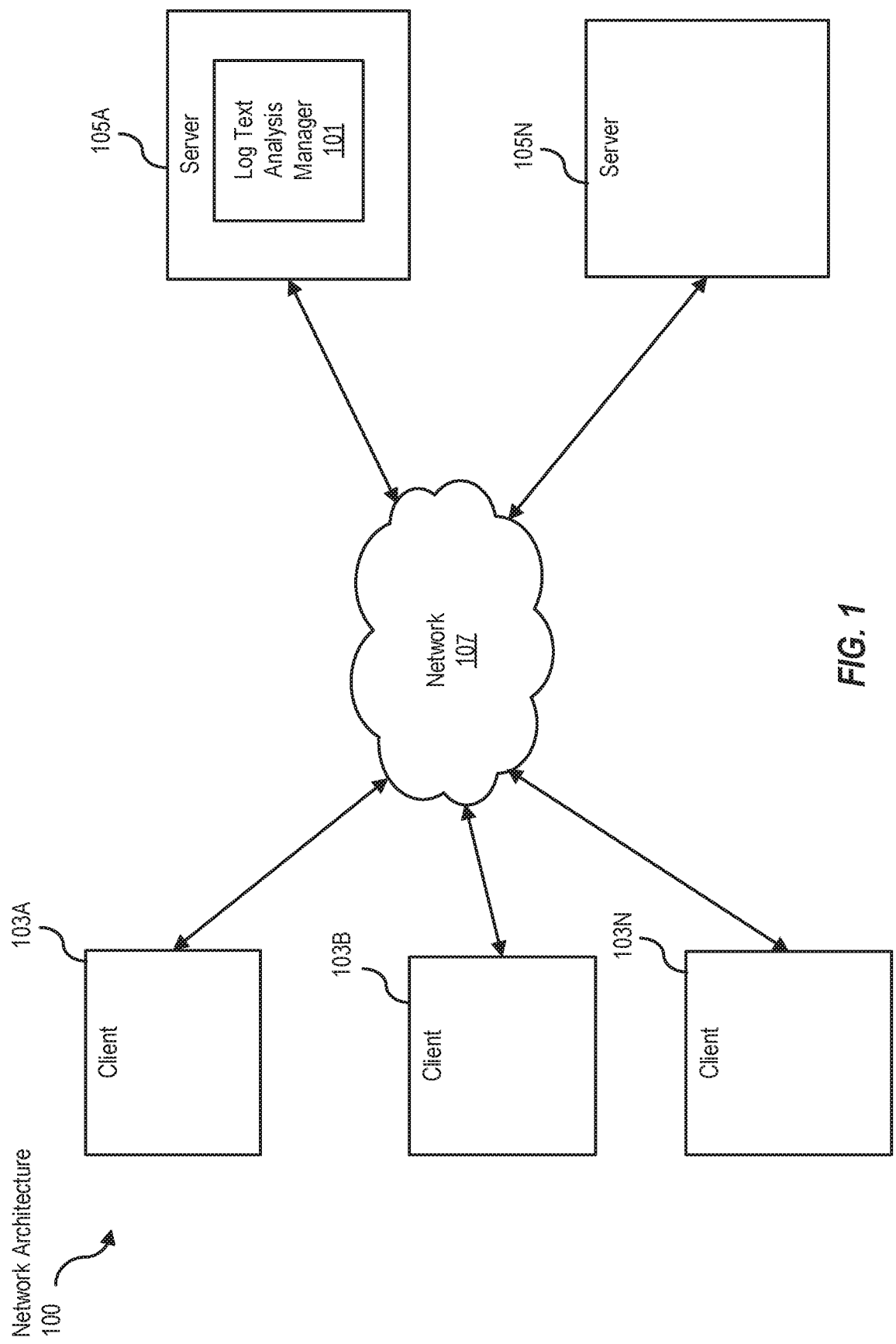
FIG. 1 illustrates a network architecture in which a log text analysis manager can operate, according to some embodiments.

FIG. 1 is a block diagram illustrating an exemplary network architecture 100 in which a log text analysis manager 101 can be implemented. The illustrated network architecture 100 comprises as multiple servers 105A and 105N, as well as multiple clients 103A, 103B and 103N. In FIG. 1, a log text analysis manager 101 is illustrated as residing on server 105A. It is to be understood that this is an example only, and in various embodiments various functionalities of this system 101 can be instantiated on a server 105, a client 103, or can be distributed between multiple servers 105 and/or clients 103.

Clients 103 and servers 105 can be implemented using computer systems 210 such as the one illustrated in FIG. 2 and described below. The clients 103 and servers 105 are communicatively coupled to a network 107, for example via a network interface 248 as described below in conjunction with FIG. 2. Servers 105 can be in the form of rack mounted computing devices, for example in a datacenter (not illustrated). Clients 103 can be in the form of mobile computing devices, comprising portable computer systems capable of connecting to a network 107 and running applications (e.g., smartphones, tablet computers, wearable computing devices, etc.). Clients may also be in the form of laptops, desktops and/or other types of computers/computing devices. Clients 103 are able to access applications and/or data on servers 105 using, for example, a web browser or other client software (not shown).

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
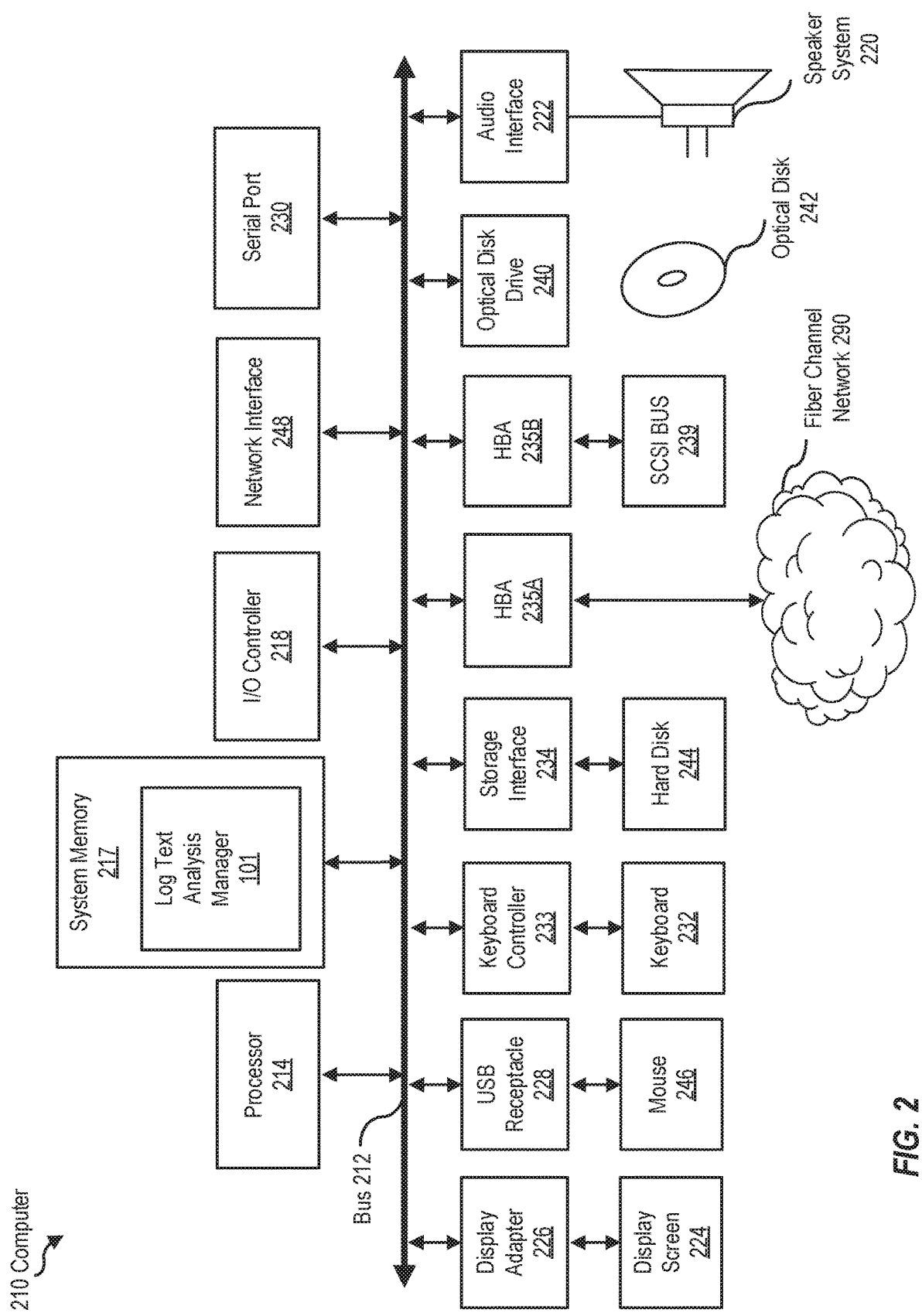
FIG. 2 is a block diagram of a computer system suitable for implementing a log text analysis manager, according to some embodiments.

FIG. 2 is a block diagram of a computer system 210 suitable for implementing a log text analysis manager 101. Both servers 105 and clients 103 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, a display adapter 226 communicatively coupled to an external video output device such as a display screen 224, one or more interfaces such as Universal Serial Bus (USB) ports 228, serial ports 230, etc., a keyboard controller 233 communicatively coupled to a keyboard 232, a storage interface 234 communicatively coupled to at least one hard disk 244 (or other form(s) of data storage media such as solid state devices), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB port 228, an audio output interface 222 communicatively coupled to an external audio device such as a speaker 220, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, flash memory, optical disk 242) and loaded into system memory 217 and executed by the processor 214. Application programs can also be loaded into system memory 217 from a remote location (i.e., a remotely located computer system 210), for example via the network interface 248. In FIG. 2, the log text analysis manager 101 is illustrated as residing in system memory 217. The workings of the log text analysis manager 101 are explained in greater detail below in conjunction with FIGS. 3-4.

The storage interface 234 is coupled to one or more hard disks 244 (and/or other storage media such as solid state devices). The hard disk(s) 244 may be a part of computer system 210, or may be physically separate and accessed through other interface systems.

The network interface 248 can be directly or indirectly communicatively coupled to a network 107 such as the Internet. Such coupling can be wired or wireless.

Figure 3:
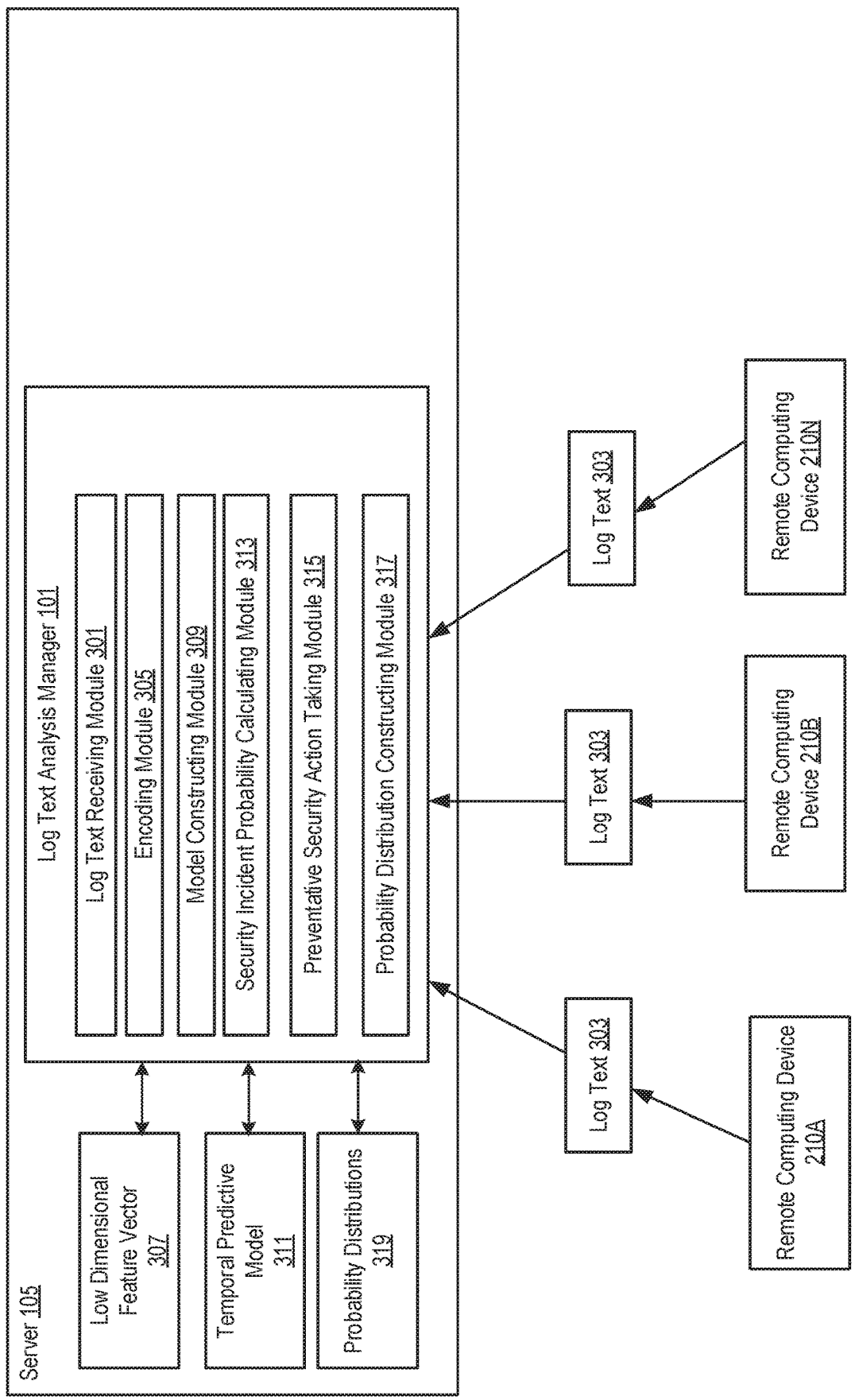
FIG. 3 is a block diagram of a log text analysis manager operating on a computing device in a networked environment, according to some embodiments.

FIG. 3 illustrates the operation of a log text analysis manager 101, according to some embodiments. As described above, the functionalities of the log text analysis manager 101 can reside on a server 105, a client 103, or be distributed between multiple computer systems 210, including within a cloud-based computing environment in which the functionality of the log text analysis manager 101 is provided as a service over a network 107.

FIG. 3 illustrates a specific multiple module instantiation of a log text analysis manager 101, according to some embodiments. It is to be understood that although the log text analysis manager 101 is illustrated as a single entity, the illustrated log text analysis manager 101 represents a collection of functionalities, which can be instantiated as a single or multiple modules as desired (an instantiation of specific, multiple modules of the log text analysis manager 101 according to one embodiment is illustrated in FIG. 3). It is to be understood that the modules of the log text analysis manager 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer,"

"server," "server computer" and "computing device" mean one or more computers configured and/or programmed to execute the described functionality. Additionally, program code to implement the functionalities of the log text analysis manager 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

Figure 4:
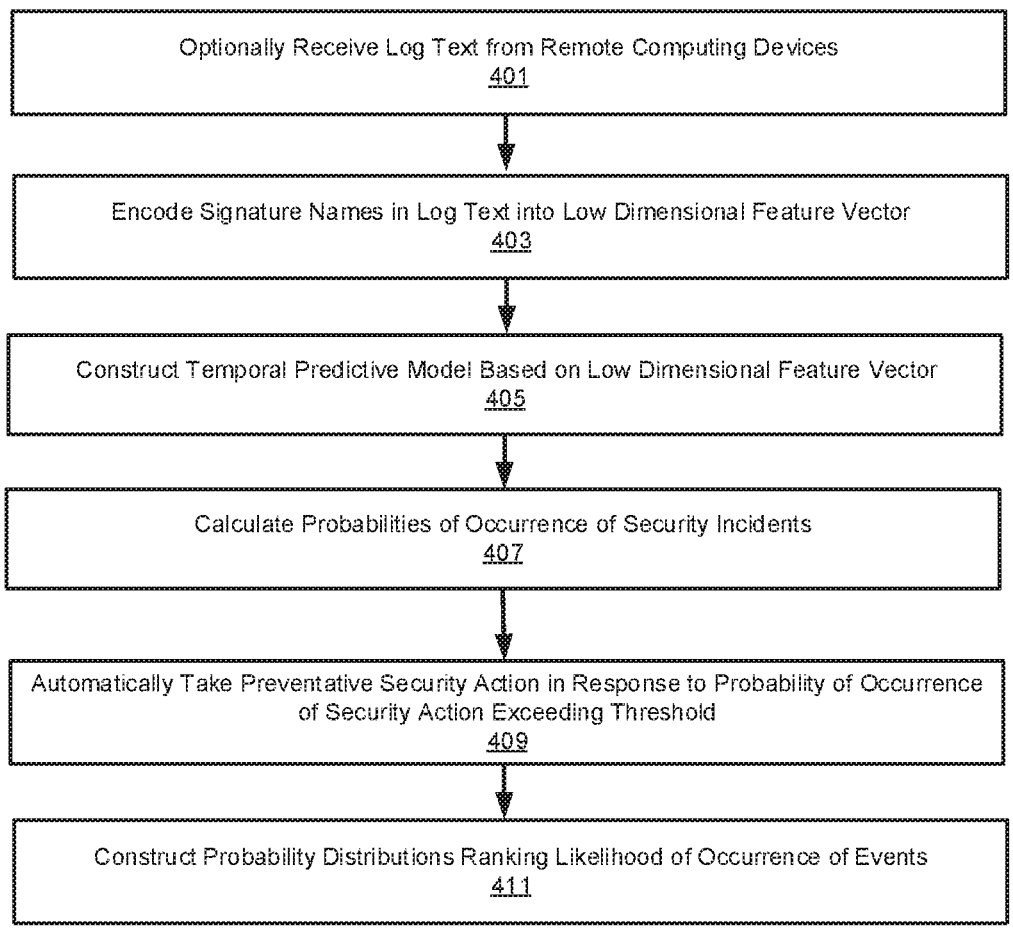
FIG. 4 is a flowchart illustrating operations of a log text analysis manager, according to some embodiments.

FIG. 4 illustrates steps executed by the log text analysis manager 101, according to some embodiments. For clarity of description, the subject matter illustrated in FIGS. 3 and 4 is described together below.

In the embodiment illustrated in FIG. 3, a log text analysis manager 101 runs on a server computer 105. A log text receiving module 301 of the log text analysis manager 101 receives 401 log text 303 from a plurality of remote or external computing devices 210. In one embodiment, these remote machines can be in the form of computing devices 210 within enterprises or other organizations that transmit log text 303 to the log text analysis manager 101 for processing and analysis. In another embodiment, the remote computing devices 210 can be in the form of endpoints within the same enterprise/organization as the server 105 on which the log text analysis manager 101 is present. In yet another embodiment, the log text analysis manager 101 does not receive log text 303 from remote computing devices 210, but instead processes log text 303 generated locally on the server 105 (or other device) on which the log text analysis manager 101 executes, and/or from other coupled computing devices 210. Combinations of these embodiments are also possible. It is to be understood that although FIG. 3 shows only three computing devices (210A, 210B and 210N) providing log text 303 to the log text analysis manager 101 for purposes of illustration and explanation, in practice orders of magnitude more remote computing devices 210 can operate in this capacity (e.g., dozens, hundreds, thousands, tens of thousands, etc.).

An encoding module 305 of the log text analysis manager 101 encodes 403 signature names in log text 303 into a low dimensional feature vector 307. Frequency information and/or temporal occurrence information concerning the signature names from the log text 303 can also be encoded in the low dimensional feature vector 307. Thus, a sequence of signature names is projected to non-linear feature space for further processing, as described in detail below. Different encoding methodologies can be used for this purpose in different embodiments. For example, in one embodiment GloVe is utilized (GloVe an unsupervised learning algorithm for obtaining vector representations for words). In another embodiment, Word2vec is used (Word2vec is a group of related models that are used to produce word embeddings in the form of shallow neural networks, e.g., neural networks with one hidden layer). It is to be understood that GloVe and Word2vec are just examples of encoding techniques that can be used in this context. Many algorithms for encoding text into low dimensional feature vector space are known to those of skill in the art, and could be applied in this context by a skilled artesian in light of this specification.

To capture the sequential and temporal aspects of the log text 303 being encoded, recurrent neural networks (RNNs) can be used. A recurrent neural network (RNN) is a class of neural network in which connections between nodes form a directed graph along a sequence. This allows the RNN to exhibit temporal dynamic behavior for a time sequence. RNNs can use their internal state (memory) to process sequences of inputs. Thus, a given amount of received log text 303 (e.g., a sequence of signatures) can be mapped to a feature vector, thereby allowing the extraction of sequential, temporal patterns of signatures as described in detail below. Seq2Seq and Temporal RNNs are examples of specific techniques that can be used to project a sequence of log text 303 to non-linear feature space in this context.

It is to be understood that once log text 303 has been encoded to vector space, the resulting low dimensional feature vector 307 can be processed and analyzed in useful ways which are impracticable for the raw log text 303. As explained above, the raw log text 303 is great in quantity, and noisy in quality. For example, multiple different words and phrases map to the same events and types of events, making the raw log text 303 unsuitable for use to correlate individual signatures and sequences thereof to the occurrence of specific security events. On the other hand, the low dimensional feature vector 307 can be used to discover the latent topics of various signature names, and learn relationships between them automatically. Different signatures from the log text 303 that correspond to the same or similar events can have the same or similar identifiers in the low dimensional feature vector 307. Similar types of events can be clustered in the vector space, and events can be classified by type. It is to be understood that this can be done automatically without human interaction, using machine learning and other artificial intelligence techniques. For example, GloVe training can be performed on aggregated global word-word co-occurrence statistics from an input corpus (e.g., the log text 303), and the resulting representations show linear substructures of the word vector space. Word2vec neural networks can be trained to reconstruct linguistic contexts of words. Word2vec takes a corpus of text (e.g., the log text 303) as its input and produces a vector space. Word vectors are positioned in the vector space such that words that share common contexts in the input are located in close proximity to one another in the vector space. Seq2Seq or other temporal RNN methodology can be used to track temporal activity at the level of the low dimensional feature vector 307.

In order to predict probabilities of future events and learn patterns, a model constructing module 309 of the log text analysis manager 101 constructs 405 a temporal predicative model 311 based on the low dimensional feature vector 307. In one embodiment, the model constructing module 309 uses the hidden Markov model (HMM) for this purpose. HMM is a temporal probabilistic model in which the state of a process is described by a single discrete random variable, the possible values of which are the possible states of the system. To apply an HMM to a system with multiple state variables, the variables are described by a single megavariable, the possible values of which are the possible tuples of the values of the individual state variables. An HMM can thus be used to determine the probability of transitions from given states to possible outcome states. Thus, the probability of the occurrence of various events (e.g., security incidents and families thereof) can be calculated, based on the non-linear feature representation of signature sequences.

It is to be understood that HMM is only one example of a temporal probabilistic modeling technique that can be used in this capacity. In other embodiments, other techniques are used for this purpose, such as, for example, Kalman filtering, dynamic Bayesian networks, long short-term memory (LSTM) based predictors, etc. Many algorithms and techniques for temporal probabilistic modeling are known to those of skill in the art, and could be applied in this context by a skilled artesian in light of this specification.

Based on the temporal predictive model, a security incident probability calculating module 313 of the log text analysis manager 101 calculates 407 probabilities of the occurrence of various security incidents based on signature names and sequences thereof in the encoded log text 303. It is to be understood that as the term is used herein, a "security incident" is an event or series of events on one or more computing devices indicative of an attack (e.g., installation/execution of malware or another type of malicious system compromise) in response to which it is desirable to take a security action. Based on the observed sequential patterns of signature names and security incidents, the probabilistic association between given signature names in the log text 303 and the likelihood of the occurrence of given security incidents is automatically learned. This unveils the temporal correlation between the observed signatures, and enables the log text analysis manager 101 to automatically forecast the likelihood of the of occurrence of given security incidents based on analyzed sequences of log text 303.

Given a sequence of observed signatures in a section of log text 303, the respective probabilities of the various possible resultant incidents can be calculated, enabling the automatic identification of key signatures that are strongly predicative of the occurrence of a given security incident. The security incident probability calculating module 313 can estimate conditional occurrence probability of a given security incident, given the detection/observation of key signature names in a sequence of log text 303. In one embodiment, the security incident probability calculating module 313 can apply a generative model (e.g., a beta distribution based generative linear model) to describe the occurrence probability of security incidents given the sequential patterns of signature names.

When the probability of the occurrence of a specific security incident exceeds a given threshold, a preventative security action taking module 315 of the log text analysis manager 101 can automatically take 409 preventative security action (e.g., blocking of specific events on one or more target machines, removal of one or more files, cleaning malicious code from one or more files, triggering of an alert such as an electronic notification of a human analyst, etc.).

Based on the above described functionality, a probability distribution constructing module 317 of the log text analysis manager 101 can construct 411 probability distributions 319, ranking the likelihood of various future events based on sequences of analyzed log text 303, e.g., originating from given computing devices and/or networked organizations/enterprises.

It is to be understood that although such probability distributions 319 can indicate whether a particular computing device 210 or networked organization/enterprise has been compromised or is currently under attack, the utility of such probability distributions 319 is far broader than that, as they can be used more generally. For example, probability distributions 319 can be provided as input to a Security Incident and Event Manager (SEIM) or Managed Security Service Provider (MSSP), for example to provide better prior probabilities, e.g., for detecting clusters of events that are more and less likely to be of interest to security analysts or clients of these services. Probability distributions 319 can instead or also be used to automatically prioritize and filter signatures to be used, e.g., in the creation of rule-based security analytics, security event identification and incident generation, e.g., within the context of a SEIM or MSSP, as well as by identifying interesting events to query on to build new rule based analytics. Sets of signatures with associated probability distributions 319 that are indicative of suspicious activity warranting further action can be identified. These are just examples of uses for probability distributions 319 generated as described above.

The log text analysis manager 101 can further categorize predicted events, e.g., security incidents, by type or at any desired level of granularity, e.g., criticality. The log text analysis manager 101 can thus associate/label given signature names with types/categories of the incidents of which they are strongly predictive. Once the log text analysis manager 101 has produced probability distributions 319 concerning signature names and sequences thereof and these signatures have been identified as being strongly predictive of specific types of security incidents, received log text 303 can be automatically analyzed, and observed signature names/sequences can automatically trigger an indicated likelihood of the future occurrence of a security incident of a given type. In addition, a corresponding security action can be taken automatically in response.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures, and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer-implemented method for identifying evidence of security incidents by analyzing log text, at least a portion of the method being performed by a computing device having one or more processors, the method comprising the following steps:

encoding log text into a low dimensional feature vector, wherein encoding log text into a low dimensional feature vector further comprises encoding signature names in the log text into the low dimensional feature vector;

constructing a temporal predictive model based on the low dimensional feature vector;

using the temporal predictive model to calculate probabilities of occurrence of security incidents based on at least signature names from the log text encoded in the low dimensional feature vector, wherein using the temporal predictive model to calculate probabilities of occurrence of security incidents based on at least signature names from the log text encoded in the low dimensional feature vector further comprises, automatically forecasting likelihoods of occurrence of given security incidents based on at least one analyzed sequence of log text; and automatically taking a preventative security action, in response to a calculated probability of occurrence of a specific security incident exceeding a given threshold.

2. The method of claim 1 wherein encoding log text into a low dimensional feature vector further comprises:

encoding at least one of frequency information and temporal occurrence information concerning the signature names in the log text into the low dimensional feature vector.

3. The method of claim 1 wherein encoding log text into a low dimensional feature vector further comprises:
utilizing an unsupervised learning algorithm to obtain vector representations of words.

4. The method of claim 1 wherein encoding log text into a low dimensional feature vector further comprises:
producing word embeddings in at least one shallow neural network.

5. The method of claim 1 wherein encoding log text into a low dimensional feature vector further comprises:
utilizing at least one recurrent neural network to capture sequential and temporal aspects of the log text in the low dimensional feature vector.

6. The method of claim 1 wherein constructing a temporal predictive model based on the low dimensional feature vector further comprises:
using a hidden Markov model to construct the temporal predictive model based on the low dimensional feature vector.

7. The method of claim 1 wherein constructing a temporal predictive model based on the low dimensional feature vector further comprises:
to construct the temporal predictive model based on the low dimensional feature vector, using at least one of: Kalman filtering, a dynamic Bayesian network and a long short-term memory based predictor.

8. The method of claim 1 wherein using the temporal predictive model to calculate probabilities of occurrence of security incidents based on at least signature names from the log text encoded in the low dimensional feature vector further comprises:
automatically learning probabilistic associations between given signature names in the log text and likelihoods of occurrence of given security incidents, based on the observed sequential patterns of signature names and security incidents.

9. The method of claim 1 wherein using the temporal predictive model to calculate probabilities of occurrence of security incidents based on at least signature names from the log text encoded in the low dimensional feature vector further comprises:
automatically identifying key signatures that are strongly predicative of occurrence of a given security incident.

10. The method of claim 1 wherein using the temporal predictive model to calculate probabilities of occurrence of security incidents based on at least signature names from the log text encoded in the low dimensional feature vector further comprises:
estimating a conditional occurrence probability of a given security incident, in response to detecting key signature names in a sequence of log text.

11. The method of claim 1 wherein using the temporal predictive model to calculate probabilities of occurrence of security incidents based on at least signature names from the log text encoded in the low dimensional feature vector further comprises:
applying a generative model to describe an occurrence probability of a security incident based on at least one sequential pattern of signature names.

12. The method of claim 1 wherein automatically taking a preventative security action in response to a calculated probability of occurrence of a specific security incident exceeding a given threshold further comprises:
performing at least one action from a group of actions consisting of: blocking a specific event on a computing device, removing at least one file from a computing device, and cleaning malicious code from at least one file on a computing device.

13. The method of claim 1 further comprising:
automatically learning latent topics of signature names, based on the low dimensional feature vector.

14. The method of claim 1 further comprising:
automatically learning relationships between signature names, based on the low dimensional feature vector.

15. The method of claim 1 wherein:
same or similar events represented by different signatures in the log text have same or similar identifiers in the low dimensional feature vector.

16. The method of claim 1 wherein:
events represented by signatures in the log text are clustered by event type in the low dimensional feature vector.

17. The method of claim 1 further comprising:
constructing probability distributions ranking likelihood of specific future events based on sequences of analyzed log text.

18. The method of claim 1 further comprising:
providing constructed probability distributions as input to a security incident and event manager or to a managed security service provider.

19. The method of claim 1 further comprising:
associating given signature names with types or categories of security incidents of which the given signature names are determined to be strongly predictive.

* * * * *